United States Patent

[11] 3,599,669

[72] Inventor Allen F. Polzer
 108 Cadmus Ave., East Paterson, N.J. 07407
[21] Appl. No. 33,651
[22] Filed May 1, 1970
[45] Patented Aug. 17, 1971

[54] AUTOMATIC LAWN SPRINKLER CONTROL
 5 Claims, 6 Drawing Figs.
[52] U.S. Cl. ................................................ 137/608, 137/609, 200/153 T
[51] Int. Cl. ................................................ F16k 11/10
[50] Field of Search ........................................ 137/609, 608; 307/118; 200/61.86

[56] References Cited
UNITED STATES PATENTS

| | | | |
|---|---|---|---|
| 1,997,246 | 4/1935 | Berlyn | 307/118 X |
| 2,085,916 | 7/1937 | Marra | 137/609 X |
| 2,721,101 | 10/1955 | Richard | 307/118 |
| 2,965,134 | 12/1960 | Pouppirt | 137/609 X |
| 3,011,509 | 12/1961 | Wilson | 137/609 X |
| 3,024,372 | 3/1962 | Seele | 307/118 |
| 3,144,046 | 8/1964 | Seesselberg | 137/609 X |

Primary Examiner—Robert K. Schaefer
Assistant Examiner—William J. Smith
Attorney—Reno A. Del Ben ABSTRACT: A control-valve mechanism which may be used to control the flow of liquids from one inlet to a number of outlets, which includes a plurality of valves operated by a cam. The cam is operated through an electric motor having a control circuit which includes a timer and a timer bypass switch, the bypass switch being operated by a trip arm which is connected to the cam.

PATENTED AUG 17 1971 3,599,669

INVENTOR
ALLEN F. POLZER
BY
ATTORNEY

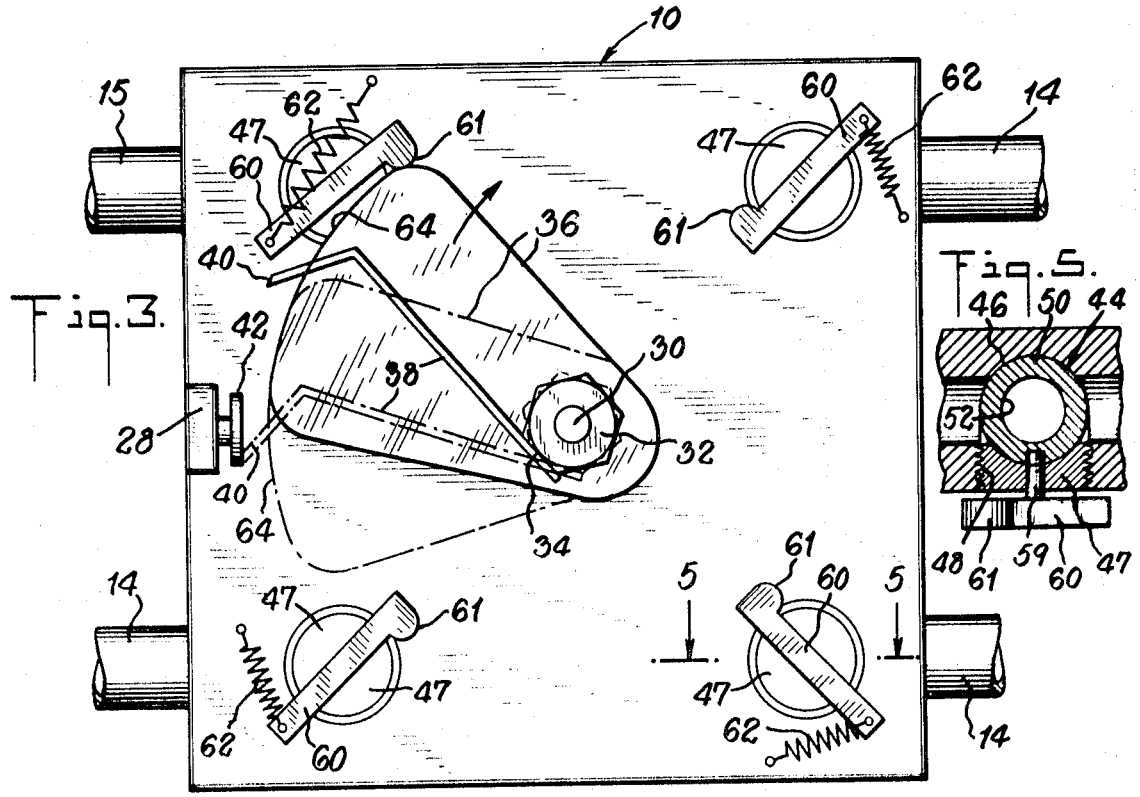
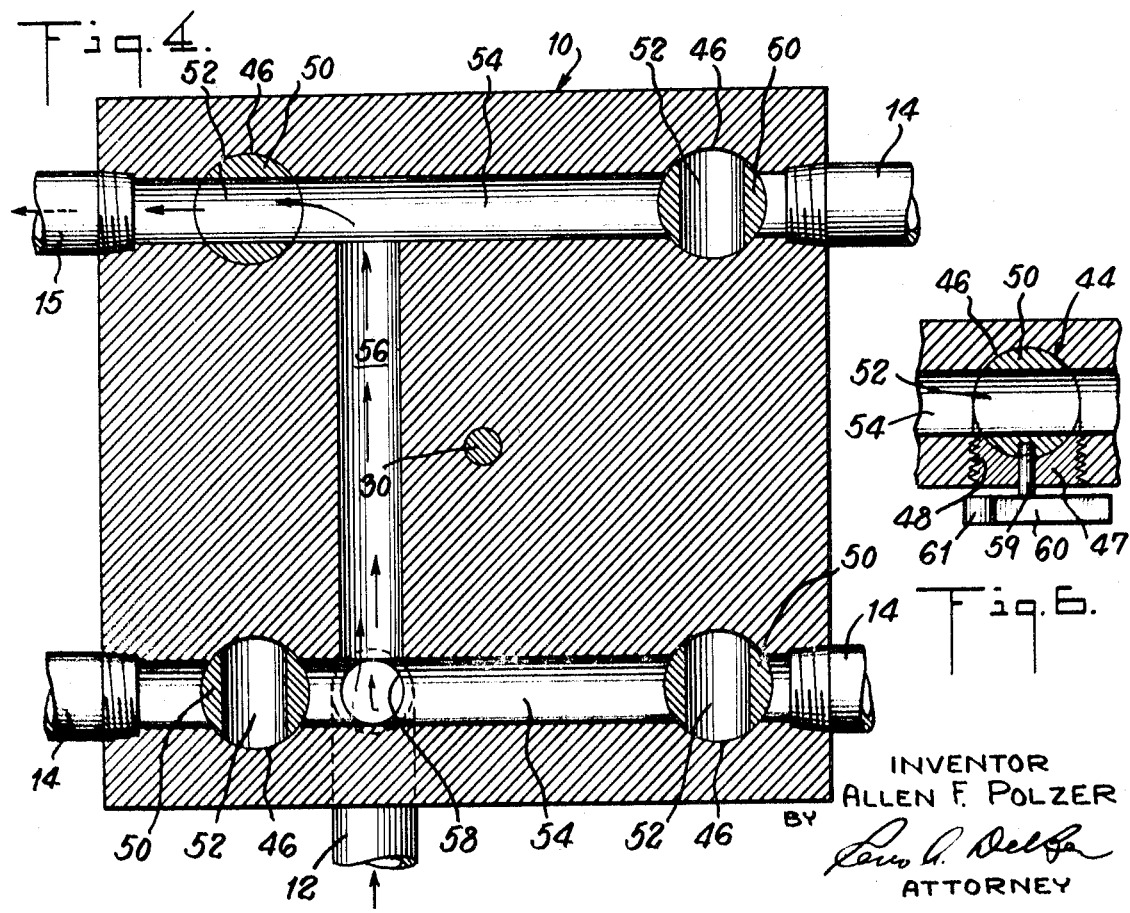

AUTOMATIC LAWN SPRINKLER CONTROL

This invention deals with control valves and more particularly with control valve assemblies having an inlet and a plurality of outlets and which may be used for controlling the flow of water alternately through a series of water hoses or pipes.

In the past, valves and valve assemblies which have been available for the control of water or other fluids have generally been capable of operating through only one cycle, or else have not been capable of being automatically opened or shut at predetermined intervals of time.

The present invention is a clock operated lawn sprinkler control valve assembly having an inlet and a plurality of outlets, the flow of water or fluid being controlled by alternately opening and blocking off different outlets.

One of the objects of this invention is to provide a clock controlled valve assembly which may be used in operating a lawn sprinkling system.

Another object of this invention is to provide a clock operated valve for a lawn sprinkling system which will operate for a predetermined period of time and which will then shutoff completely and automatically.

Still another object of this invention is to provide a clock operated valve assembly, which may be used for a lawn sprinkling system and which may be operated for a predetermined but changeable period of time and which will completely shutoff the flow of water after said period of time.

Still another object of this invention is to provide a clock operated valve assembly which will cycle water through a series of water hoses or pipes for predetermined periods of time and which will first close off the flow of water through one water hose or pipe before opening the flow of water through another water hose or pipe.

Yet another object of this invention is to provide a clock operated valve assembly which will slowly shut off the flow of water through one outlet before opening the flow of water through another outlet, thereby eliminating a water hammer effect.

Another object of this invention is to provide a valve assembly which may be automatically opened and closed at predetermined, but changeable times.

These and other objects of the invention will appear from time to time as the following specifications proceed and with reference to the accompanying drawings wherein:

FIG. 3 is a bottom plan view of the invention showing the valve control levers;

FIG. 4 is a horizontal section view taken on plane 4-4 shown in FIG. 1 and viewed in the direction of the arrows, showing the water passages through the valve;

FIG. 5 is a vertical sectional view of a ball valve used to open and close the valve outlets, the ball valve being shown in the closed or off position, the section being taken on the plane 5-5 shown in FIG. 3 and viewed in the direction of the arrows;

FIG. 6 is a vertical sectional view of a ball valve identical to FIG. 5 but with the valve being shown in the open or on position.

Referring to the drawings in which the same parts have been given the same numerals in the several drawings:

Figure 1:
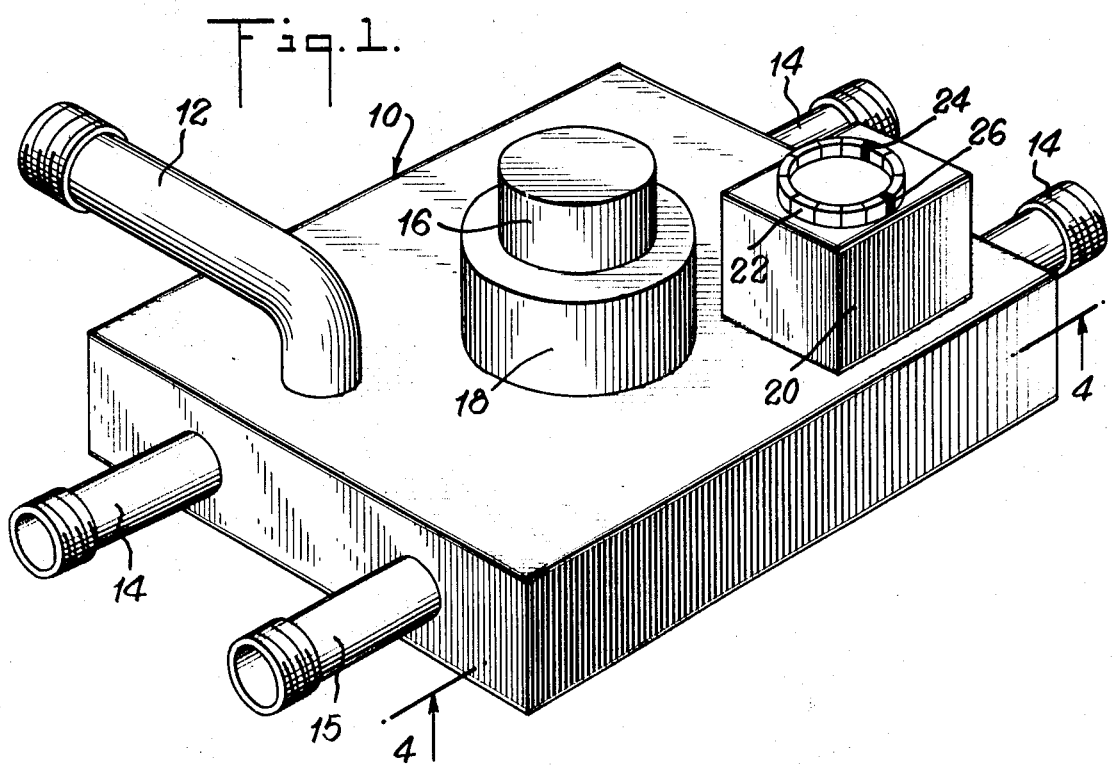
FIG. 1 is a view in perspective of the sprinkler control valve assembly.

The invention, in its preferred embodiment, comprises a body, 10, to which there is mounted a motor, 16, and a motor speed reducer, 18, driven by the motor, 16. The motor may be of any conventional fractional horsepower type. The motor, 16, is coupled to the speed reducer 18 either through gears or by any other conventional method. The speed reducer is preferably of the worm gear box type, in which the shaft speed of the motor is greatly reduced. A shaft, 30, having threads at one end, extends out of the gear box and is rigidly connected to a cam, 36, and held thereon by a nut, 32. When used as a lawn sprinkler control valve, it is desirable that the speed reducer 18 should be of such a construction so as to drive the shaft 30 at a speed of approximately 1 revolution per hour.

Provided within the body, 10, are interconnecting passageways, 54, which connect to an inlet, 12, on the exterior of the body, 10, and to a plurality of outlets, 14, also on the exterior of the body, 10. The opening and closing of the outlets, 14, are each controlled by separate ball valve assemblies, 44, which are spaced at equal radial distances from the center of the shaft 30. The ball valve assemblies 44 are inserted into cavities 46, in the body, 10, which cavities intersect the passageways, 54, near the outlets, 14.

Connected to the cam, 36, is a trip arm, 38, one end of which extends beyond the end of cam 36. A spring-loaded switch 28, connected to the motor 16 and to a source of electrical power, which is normally in the closed or on position, is connected to the body 10 at a point which lies at an angle approximately halfway between two adjacent ball valve assemblies, 44. The switch has an arm, 42, which is biased radially towards the center of the shaft 30. When no pressure is exerted on the arm 42 it extends towards shaft 30, and the switch contacts are closed. However, as the cam 36 with the connected trip arm 38 rotates around the central axis of shaft 30 the trip arm 38 will at some point come into contact with arm 42 and start to push arm 42 away from shaft 30, and as the cam 36 with the connected trip arm 38 continues to rotate, at some point the contacts in switch 28 will be opened, resulting in the flow of electricity through switch 28 being cutoff.

Turning now to the operation of the ball valve assemblies, 44. Each of the all valve assemblies 44 comprises a ball valve 50 which is generally spherical in shape and which has a stem 59 connected thereto, and has a circular hole, 52, passing through the center of the ball valve 50 at right angle to the valve stem, 59. The ball valve, 50, should preferably be greater in diameter than the passages 54, and the hole 52 should preferably be of the same or slightly smaller in diameter than the diameter of passages 54. The ball valve is mounted in a cavity, 46, which is drilled into the body 10, and the cavity 46 has a generally spherically shaped inner surface whose radius is slightly greater than the radius of the ball valve 50, for a distance equal to approximately one-half of the diameter of the ball valve, 50, measured from the most inner surface of the cavity. From a distance equal to approximately one-half of the diameter of the ball valve 50, measured from the most inner surface of the cavity, to the surface of the body, 10, the cavity has a cylindrical shape and is provided with screw threads 48. A threaded retaining member, 47, having threads which mate with the threads provided around the cylindrically shaped portion of the cavity, is screwed into the cavity 46 and retains the ball valve, 50, within the cavity. The inner surface of the threaded retaining member 47 is also spherically shaped and has a radius slightly greater than the radius of the ball valve 50. A hole is provided through the center of the threaded retaining member 47, and is slightly greater in width than the width of the valve stem, 59, and is designed to receive and hold the valve stem, 59.

In assembly, the ball valve 50 is first placed within the cavity, 46, with the valve stem, 59, extending outwards from the cavity, 46. The threaded retaining member 47 is then slipped over the valve stem 59 and is screwed into the cavity 46 to such an extent that the ball valve 50 is firmly but rotatably retained. It is desirable that the clearance between the ball valve, 50, and the sides of the cavity, 46, and between the ball valve, 50, and the threaded retaining member, 47, be such that the ball valve, 50, will rotate freely, but that no water will escape between the ball valve, 50, and the sides of the cavity, 46, or between the ball valve, 50, and the retaining member, 47. The hole, 52, in the ball valve, 50, is located in such a position that it aligns with passage way 54 in one position (the open position) and may be turned at right angle to passageway 54 (the closed position). A valve operating arm 60 having a rounded portion 61, is securely mounted to the valve stem, 59, and is used to turn the ball valve 50. A spring, 62, is connected to the valve operating arm 60 and biases the ball towards a closed position. A stop may be provided to insure that the spring 62 will not rotate the ball valve 50 beyond its fully closed position.

Each of the ball valve assemblies, 44, is located on the body 10 in such a position with respect to shaft 30 so that the cam 36, and the trip arm 38 may be rotated past the ball valve assembly 44, without binding, but with cam 36 operating the ball valve 50. The operation of the ball valve 50 by the cam 36 is done in the following manner: As the cam 36 rotates around the axis of shaft 30, being driven by shaft 30, face 64 of cam 36 will at some point come into contact with the rounded portion 61 of arm 60. As the cam continues to rotate, face 64 of cam 36 will push against the rounded portion 61 of arm 60 and will force arm 60 to rotate against the force of spring 62, thereby causing ball valve 50 to rotate to its most fully open position, the speed at which ball valve 50 is opened being governed by the geometric shape of face 64. As the cam continues to rotate the face 64 of cam 36 will at some point recede towards shaft 30 with reference to the point of contact between face 64 and rounded portion 61, allowing spring 62 to force ball valve 50 to its closed position. Face 64 is generally elliptically shaped with its greatest distance from the center of shaft 30 occurring in the vicinity of the axis of cam 36. The curvature of face 64 and the location of cam 36 with respect to each of the valve assemblies 44 is preferably such that the ball valve 50 will be in its most open position when rounded portion 61 of arm 60 of any one valve assembly is located in the vicinity of the axis of cam 36, and is such that the ball valve 50 will be in a fully closed position when the face 64 of cam 36 first makes contact with the rounded portion 61 of arm 60 and when face 64 of cam 36 has receded completely from the rounded portion 61 of arm 60. As an alternate, the central portion of face 64 may have a circular configuration, with the axis of shaft 30 being at the center of the circle.

Figure 2:
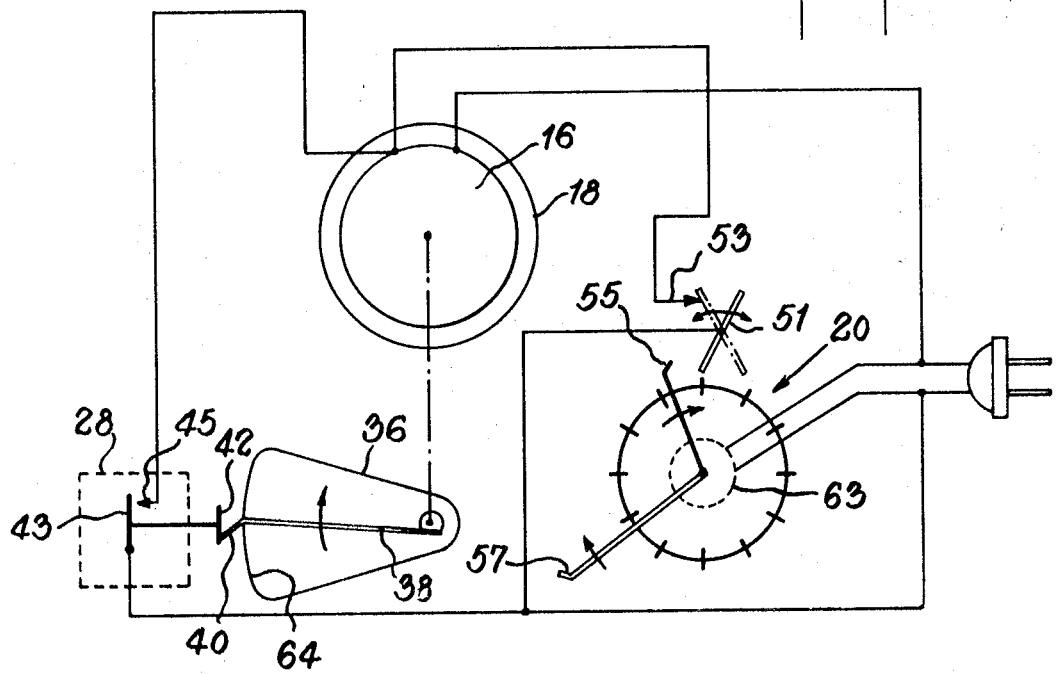
FIG. 2 is a schematic of the electrical portion of the invention.

FIG. 2 schematically indicates the electrical circuitry of the invention and the wiring connections which operate motor 16. Basically the control mechanism comprises a timer 20 and a bypass switch 28 wired in parallel to motor 16, and to an electrical source. The timer may be of the conventional type wherein electricity is allowed to flow and to be cut off at specific times. The timer is shown in FIG. 2 to comprise a clock mechanism 63 to which there is connected a movable start arm 55 and a movable stop arm 57. The start arm and the stop arm are different lengths and have fingers extending at right angles to the arms. These fingers operate an on-off switch by moving either the top or the bottom of the switch thereby causing a circuit to be either made or broken between movable contacts 51 and fixed contacts 53 of the on-off switch. The start and stop arms are movable on the clock mechanism so that the time interval between the making and breaking of the electrical circuit through the on-off switch may be varied. Start arm 55 and stop arm 57 are adjusted by adjustments 24 and 26, respectively, which are shown in FIG. 1 mounted on an external clock indicator, 22.

Wired in parallel to the on-off switch—timer circuit is a bypass switch 28. Switch 28 comprises a fixed contact 45 and a movable contact 43, the movable contact being controlled by the trip arm 38 through the movable arm 42, as heretofore indicated.

Operation of the invention is quite simple. The start arm 55 and the stop arm 57 of the timer 20 are adjusted to an appropriate time and period of operation. The invention is connected to a power source which delivers power to the timer 20 and to the bypass switch 28, causing the clock mechanism of the timer circuit to operate. When the time for the motor 16 which operates the cam 36 through the speed reducing mechanism 18 is reached, the timer delivers current to the motor 16 the motor activates the cam 36. The trip arm 38 connected to the cam 36 moves off of and releases the movable arm 42 of the bypass switch 28 which in turn closes the circuit from the power source through the bypass switch 28 to the motor 16. The cam 36 continues to rotate and alternately opens and closes the various ball valves 50 in the manner hereinabove stated. As long as the timer circuit is closed, power is delivered through the timer circuit to the motor 16, and the cam 36 will complete cycle after cycle. At some point the stop arm 57 will open the on-off switch and stop power from flowing through the timer circuit to the motor 16. However, provided that at the time the flow of power through the timer circuit is cut off the end 40 of trip arm 38 is not engaging the movable arm 42 of the bypass switch, the bypass switch 28, which is of the momentary-off type, will permit power to continue to flow through the bypass switch to the motor 16 and will continue to do so until the trip arm 38 engages the movable arm 42 of the bypass switch to the extent that the connection between contacts 43 and 45 is broken, at which time power will then be cut off to the motor 16. Because of the incorporation in parallel of the bypass switch 28 with the timer 20 the motor operates only for enough time after the timer circuit is opened to complete a full cycle of operation of the cam 36, thus ensuring that the ball valves 50 are in the fully closed position when the motor finally does stop.

An additional feature of this invention is that, through the use of the ball valves and the cam mechanism, the flow of water can be slowly opened and closed, thereby eliminating a water-hammer effect.

While one embodiment of the invention has herein been shown and described, it may readily be understood that various modifications and variations in the invention may be attained without departing from the spirit and scope of the novel concepts thereof, as defined by the claims appended hereto.

I claim:

1. A control valve mechanism comprising a base, an inlet provided on the surface of said base, a plurality of outlets provided on the surface of said base, channels connecting the inlet and outlets forming passageways between the inlet and the outlets, valve means for separately opening and blocking off each of the passageways between the inlet and the several outlets, an electrical motor, linkage means permitting the electrical motor to operate the valve means, a timer connecting the electrical motor to a source of electrical power, a bypass switch connected in parallel with the timer to the electrical motor and to a source of electrical power, and trip means for activating the bypass switch.

2. A control valve mechanism as claimed in claim 1 wherein the valve means comprise a plurality of ball valve assemblies, each of said ball valve assemblies comprising a ball valve located in a cavity provided in the body and intersecting a passageway leading to an outlet, said ball valve being provided with a stem, the ball valve having a hole passing through the ball valve, a retaining member for retaining the ball valve within the cavity, said retaining member being provided with a hole through which the stem of the ball valve may be inserted, a valve operating arm connected to said stem, and a spring biasing the ball valve towards a closed position, the hole in the ball valve being provided in such a location that it will align with the passageway when the ball valve is turned to one position by the linkage means operating on the valve operating arm and so that the hole in the ball valve will not align with the passageway when the ball valve is turned to another position by the linkage means operating on the valve operating arm.

3. A control valve mechanism as claimed in claim 2 wherein the ball valve assemblies are located circumferentially around a point on the body, and the linkage means comprises a speed reducer connected to the motor and having a shaft which extends to and is at the center of the point on the body around which the ball valve assemblies are circumferentially located, and a cam connected to said shaft and capable of moving the valve operating arms of the ball valve assemblies to such an extent as to pen the ball valves to their most open position, without binding.

4. A control valve mechanism as claimed in claim 2 wherein the bypass switch is of the momentary off type and is located between the two ball valve assemblies, and the trip means comprises a trip arm connected to the shaft of the speed reducer, the trip arm being located in such a position that the trip arm engages the bypass switch at a point where the cam does not engage any valve operating arm.

5. An automatic sprinkler control for controlling the flow of water through a series of conduits comprising a base, said base having connecting passageways provided therein, said passageways leading from a common water inlet located on the surface of the body to a plurality of outlets located on the surface of the body, means for connecting conduits to said inlet and outlets, a plurality of valves, each of which separately regulates the flow of water through an outlet, an electric motor, means for causing the electric motor to open and close each of said valves at different points in a cycle of operation of the sprinkler control, a timer connected to said motor and to a source of electric power and providing power to said electric motor to operate same during adjustable periods of time, a bypass switch wired in parallel with said timer to the electric motor and to the source of electric power, and activating means connected to said electric motor for operating said bypass switch at a specific point in a cycle of operation of the sprinkler control, said bypass switch being of the momentary-off type and providing power to the electric motor at all but a small interval in the cycle of operation of the sprinkler control, said bypass switch being activated, so as to be off, by said activating means at a point in the cycle of operation of the sprinkler control when all the valves are closed, so as to stop the electric motor at said point provided no power is flowing through the timer.